United States Patent [19]

Kasetty

[11] Patent Number: 5,448,438

[45] Date of Patent: Sep. 5, 1995

[54] HEAD ACTUATOR HAVING SPRING LOADED SPLIT NUT

[75] Inventor: Kumaraswamy Kasetty, Northboro, Mass.

[73] Assignee: Quantum Corporation, Milpitas, Calif.

[21] Appl. No.: 149,583

[22] Filed: Nov. 9, 1993

[51] Int. Cl.6 .......................... G11B 5/55; F16H 1/18
[52] U.S. Cl. ................... 360/106; 74/89.15; 74/424.8 A
[58] Field of Search ............... 360/77.12, 78.02, 106, 360/109; 74/89.15, 424.8 A

[56] References Cited

U.S. PATENT DOCUMENTS

| | | | |
|---|---|---|---|
| 3,656,358 | 4/1972 | Kopp | 74/424.8 R |
| 3,945,481 | 3/1976 | Lindberg | 400/328 |
| 3,977,262 | 8/1976 | Randolph | 74/424.8 R |
| 4,753,122 | 6/1988 | Nishikawa et al. | 74/424.8 A |
| 5,105,322 | 4/1992 | Steltzer | 360/106 |

Primary Examiner—Robert S. Tupper
Assistant Examiner—Jefferson Evans
Attorney, Agent, or Firm—David B. Harrison

[57] ABSTRACT

A magnetic tape head actuator comprising an actuator motor having a threaded output shaft and a bracket for holding a magnetic tape head. The bracket includes two spaced apart supports that have aligned passageways. The output shaft extends through the passageways. The diameter of the output shaft and the passageways are matched for stabilized sliding movement to allow the actuator bracket guided movement back and forth along the output shaft. The actuator further including a nut with a threaded passageway attached to the actuator bracket. The output shaft extends through the passageway of the nut and is in threaded engagement therewith so that rotation of the output shaft moves the actuator bracket along its length. The nut has a slot that extends axially of the threaded passageway and that is in communication therewith. An elastic member encircles the nut in resilient inwardly pressing relationship intermediate the ends of the slot. The dimensions of the slot and the pressure of the encircling member is such that the nut is elastically deformed to urge the passageway threads of the nut against the threads of the output shaft.

12 Claims, 4 Drawing Sheets

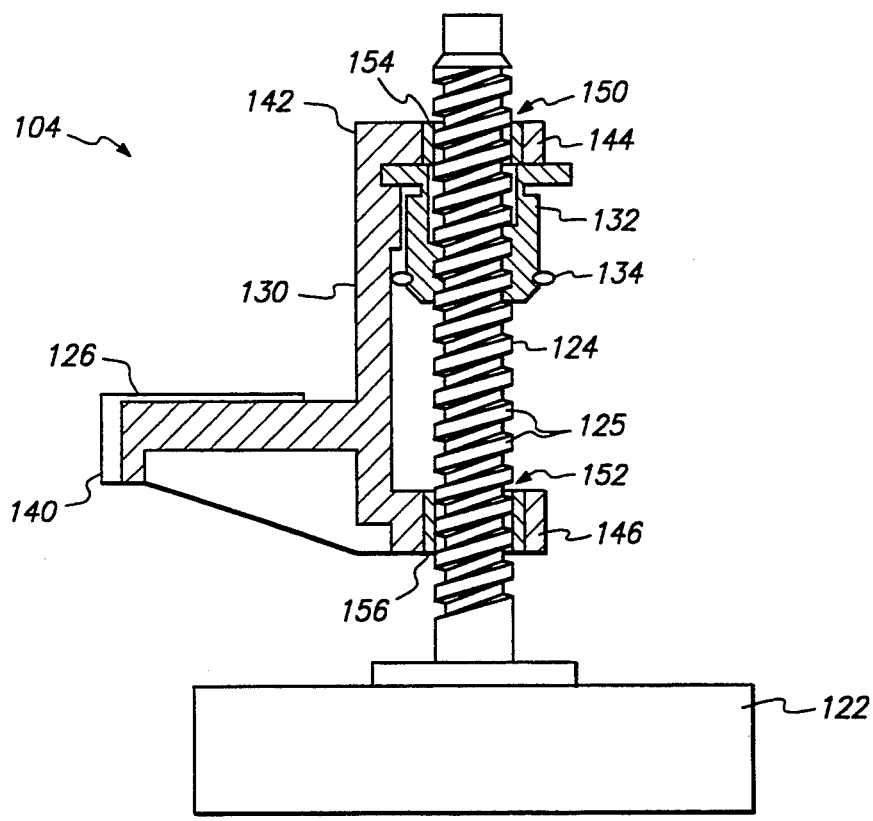
FIG. 5
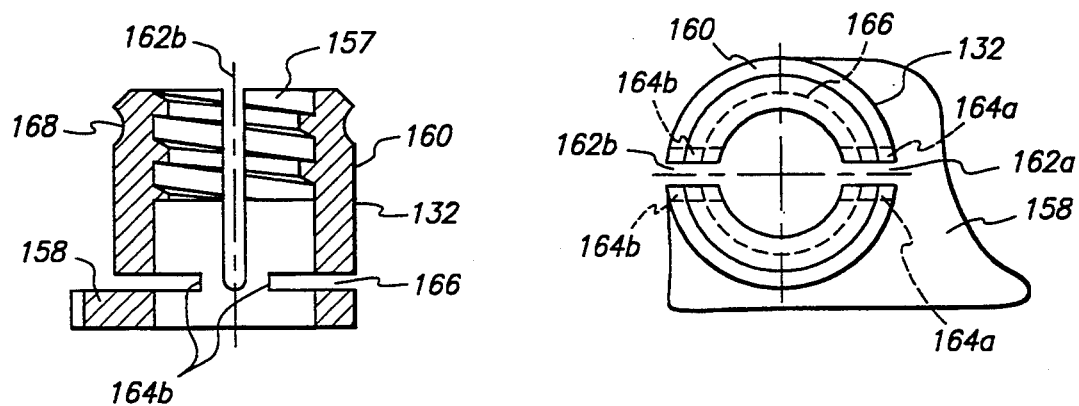
FIG. 7          FIG. 8

HEAD ACTUATOR HAVING SPRING LOADED SPLIT NUT

BACKGROUND OF THE INVENTION

This invention relates to an improved head actuator.

A tape drive for digital computer use demands great precision of its tape head actuator or positioning system, but head positioning systems are required to work in an "open loop" environment. And in an "open loop" tape drive environment there is no feed back from the head positioning system, or any other device, to keep the head centered on a tape track during operation. Consequently, the mechanical mechanisms of these head positioning systems must be exceedingly tight and stable. But the design of prior art tape head actuators have not met the task.

In operation, prior art actuators have been plagued by two major problems: backlash and tape head off-set in the azimuth direction (azimuth tilt). In operation these deficiencies produce poor alignment that causes problems such as increased noise, reduced signal strength, and increased error rate.

Regarding azimuth tilt, it is pointed out that during operation magnetic tape streams over a tape head at extremely high velocities. And at these high velocities tape movement exerts dynamic force on the tape head actuator mechanism that changes when tape direction changes. These direction changes cause a tape head to rock back and forth creating head off-set or azimuth tilt.

FIGS. 1 and 2 illustrate one prior art tape head actuator approach. FIGS. 1 and 2 show an actuator 5 that includes a tape head bracket 10 carried on the lead screw output shaft 12 of a stepper motor 14 by a partial nut 16 that engages the shaft 12. The lead screw shaft 12 extends through spaced apart bearing type guide passageways 18 and 20 formed in regions 22 and 24 of the bracket 10. As shown, the partial nut 16 engages the lead screw shaft 12 between the regions 22 and 24 under the influence of a biasing leaf spring 26. As shown, the leaf spring 26 is mounted at its ends on the bracket 10 and is bent over the nut 16 at its mid-region. Hence the leaf spring 26, which has a relatively steep force-deflection curve, urges or pre-loads the nut 16 against the lead screw shaft 12. But this urging of the nut 16 against the shaft 12 by the leaf spring 26 causes reactionary forces on the bearing surfaces of the guide passageways 18 and 20 that induce frictional drag—and consequently wear.

The physical arrangement of the actuator 5 and the use of a leaf spring contribute to backlash and azimuth tilt. As indicated above, leaf springs have a relatively steep force-deflection curve. That is, for small change in deflection a leaf spring produces a large change in force. Hence, as the nut 16 and the bearing surfaces of the guide passageways 18 and 20 wear, there is considerable reduction in biasing, or pre-loading, force of the leaf spring 26 on the nut 16 against the lead screw shaft 12. As a result there is a reduction in the effectiveness of the inter-engagement of the nut 16 and the shaft 12 that worsens backlash. Moreover, the decreased biasing force also reduces the effectiveness of the mechanism under the influence of external forces, which makes the actuator 5 susceptible to azimuth tilt.

Other prior art actuators use an actuator arrangement like that shown in FIGS. 1 and 2, but with variations in how the partial nut 16 is biased against the lead screw output shaft 12 of the stepper motor 14. For example, a cantilever mounted leaf spring arrangement has been used to bias a partial nut. Also, compression springs have been used to bias the partial nut when space permits. But each of these prior art arrangements produces reaction forces at the guide passageways, and wear makes the mechanisms more susceptible to backlash and azimuth tilt.

There remains a need for a tape head actuator that provides tracking accuracy. And in an "open loop" tape drive environment this means a tape head actuator that operates essentially free from backlash and azimuth tilt.

SUMMARY OF THE INVENTION

An object of the invention is to provide an improved head actuator.

Another object of the invention is to provide a magnetic tape head actuator with accurate tracking.

Yet another object of the invention is to provide a magnetic tape head actuator that is substantially free of backlash and azimuth tilt during a reasonable life for the actuator.

In a broad sense, these and other objects are attained by a head actuator that comprises an actuator motor having a threaded output shaft and an actuator bracket for holding a magnetic head that includes two spaced apart aligned guide passageways through which the threaded output shaft extends. The diameters of the passageways are dimensioned so that they closely match the output shaft for stabilized sliding movement to allow the actuator bracket guided movement back and forth along the output shaft. The actuator further includes a threaded and slotted nut attached to the actuator bracket that encirclingly engages the output shaft so that rotation of the shaft moves the actuator bracket along its length. The nut includes a slot that extends axially of the nut's threaded passageway. An elastic member encircles the nut in resilient inwardly pressing relationship intermediate the ends of the slot. The inward pressure of the encircling member is sufficient to elastically deform the nut to urge the passageway threads of the nut against the threads of the output shaft.

In accordance with the invention the encircling pressure urging the split nut into engagement with the threaded output shaft is isolated from the remainder of the system. That is, the urging force does not depend on or induce reactionary forces like those present in the prior art arrangements such as those shown in FIGS. 1 and 2.

The advantages of the invention over the reasonable life of a head actuator are: lower wear from lower pressure per unit area, uniform pressure around the entire circumference of the output shaft, essentially no backlash, and essentially no azimuth tilt.

The above and other objects and advantages will become more apparent as the invention is described in greater detail with respect to the following drawings.

DESCRIPTION OF THE DRAWINGS

FIG. 5 is a side elevation view, partly in section, of the tape head actuator shown in FIGS. 3 and 4.

FIG. 7 is a side elevation sectional view of the split nut shown in FIG. 6.

FIG. 8 is a plan view of the split nut shown in FIGS. 6 and 7.

DESCRIPTION OF THE PREFERRED EMBODIMENTS

Figure 3:
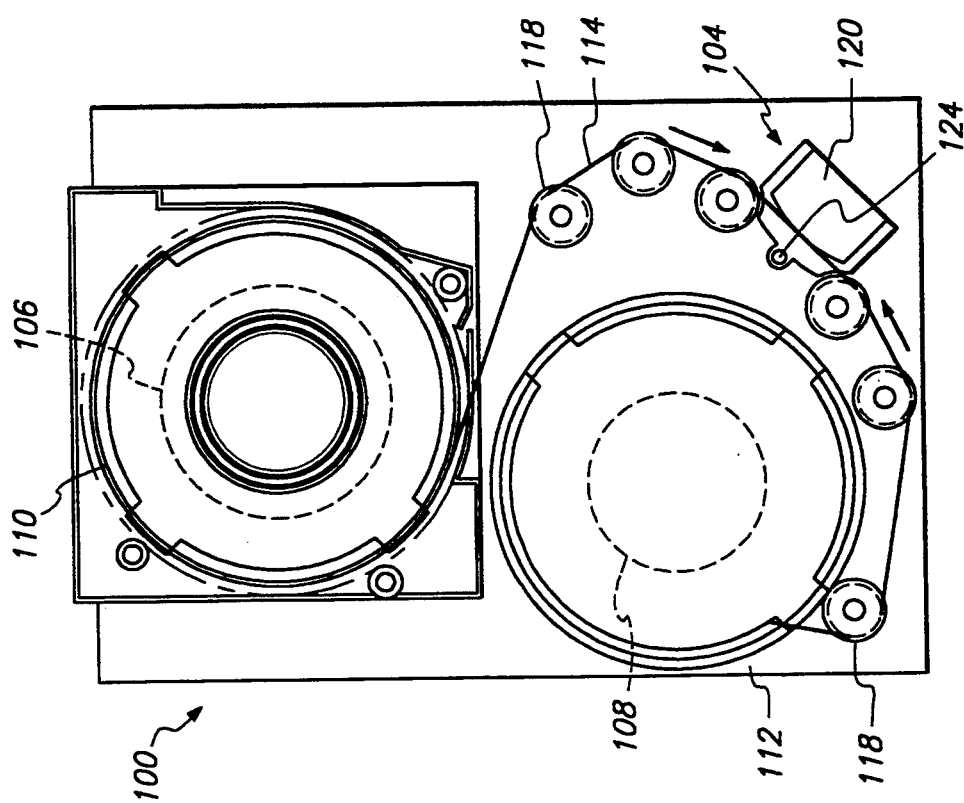
FIG. 3 is a plan view of a magnetic tape drive including a tape head actuator according to the principles of the invention.

FIG. 3 shows a tape drive 100 that includes a tape head actuator 104 according to the principles of the invention. As illustrated the drive 100 includes reel drive motors 106 and 108 (indicated in dashed lead lines) arranged to rotate reels 110 and 112 to advance magnetic tape 114 back and forth there between. The drive 100 further includes tape guide rollers 118 that define an acurate tape path between the reels 110 and 112 along which the tape 114 travels as it moves across a magnetic read/write head 120. The tape head actuator 104 operates on conventional instructions to position the magnetic head 120 laterally of the tape 114 during operation of the drive 100 to locate the head 120 at desired tape tracks.

Figure 4:
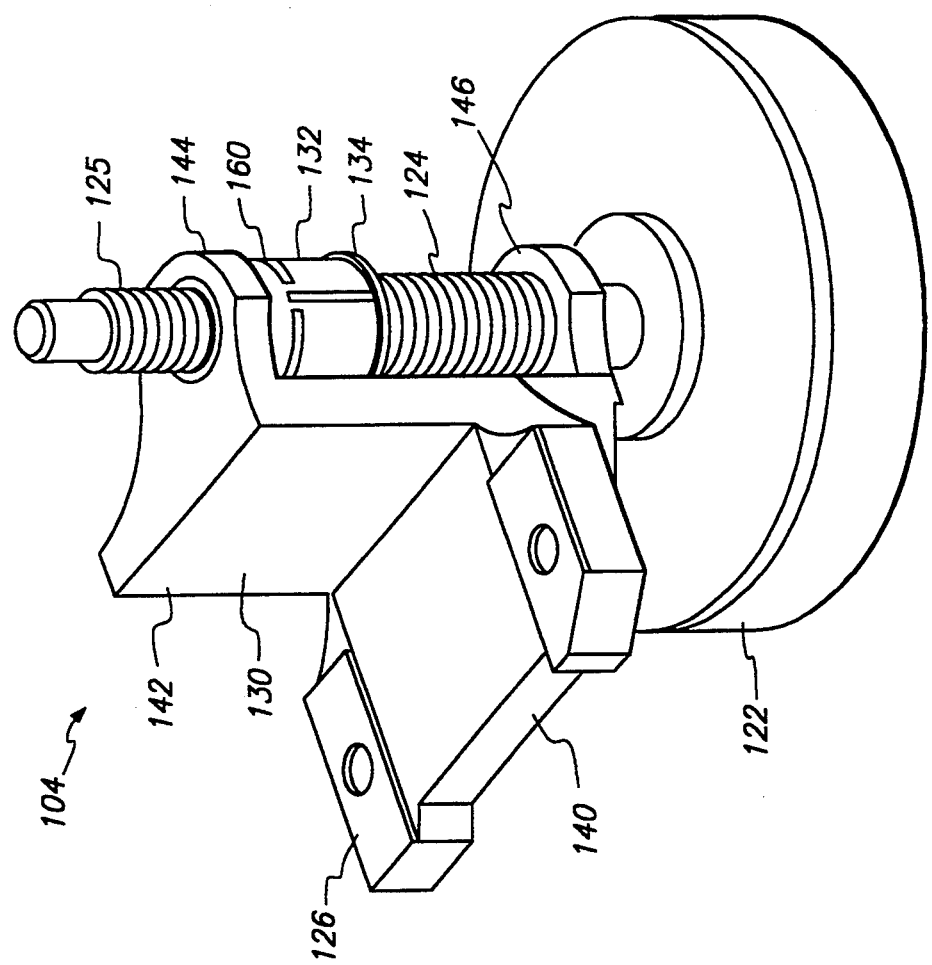
FIG. 4 is an enlarged isometric view of the tape head actuator shown in FIG. 3. The position of a magnetic head is indicated in dashed lines.

FIGS. 4 and 5 provide a more detailed showing of the tape head actuator 104. As shown, the actuator 104 includes a stepper motor 122 with a lead screw or threaded output shaft 124 with threads 125 and a bracket assembly 126 that carries the magnetic tape head 120. The tape head 120 is indicated by dashed lines. The bracket assembly 126, as illustrated, comprises a bracket 130, a split nut 132 and a circular spring 134. As shown, the bracket 130 is conveniently a single piece and shaped to include a platform 140 on which the magnetic head 120 rests, a support wall 142 situated normal to the platform 140, and spaced apart upper support ledge portion 144 and lower support ledge portion 146. The support ledge portions 144 and 146 are on the opposite side of the support wall 142 from the platform 140 and extend therefrom each in a direction parallel to the platform 140 but in the opposite direction therefrom. Moreover, the support ledge portions 144 and 146 are formed with aligned guide passageways 150 and 152 respectively. Tubular bushings 154 and 156 (see FIG. 5) form the interior surface of passageways 150 and 152 respectively. While the bushings 154 and 156, as shown, are made of acetal with 18% Teflon ® and 2% silicone, other suitable bushing material, such as bronze, can be used.

The lead screw output shaft 124 of the motor 122 extends through the guide passageways 150 and 152. The diameter of the guide passageways 150 and 152 are in closely matched relationship with the diameter of the shaft 124 for stabilized sliding movement of the bracket 130 along the length of the output shaft 124.

The split nut 132, which is shown mounted by bonding on the under side of the upper ledge 144, carries the bracket assembly 126 on the shaft 124. The split nut 132, as shown, is located between the ledges 144 and 146 by bonding to the ledge 144. The split nut can also be bonded to the ledge 146 by turning it upside down. And, in some instances, the split nut 132 might be located outside the position between the ledges 144 and 146. The interior threads of the split nut 132 engage the exterior threads of the shaft 124. Accordingly, during operation, rotation of the shaft 124 by the motor 122 moves the bracket assembly 126 (and hence the magnetic tape head 120 mounted thereon) back and forth along the length of the shaft 124. And such movement advances the head 120 laterally across the width of the tape 114 in a direction determined by the rotational direction of the shaft 124.

Figure 1:
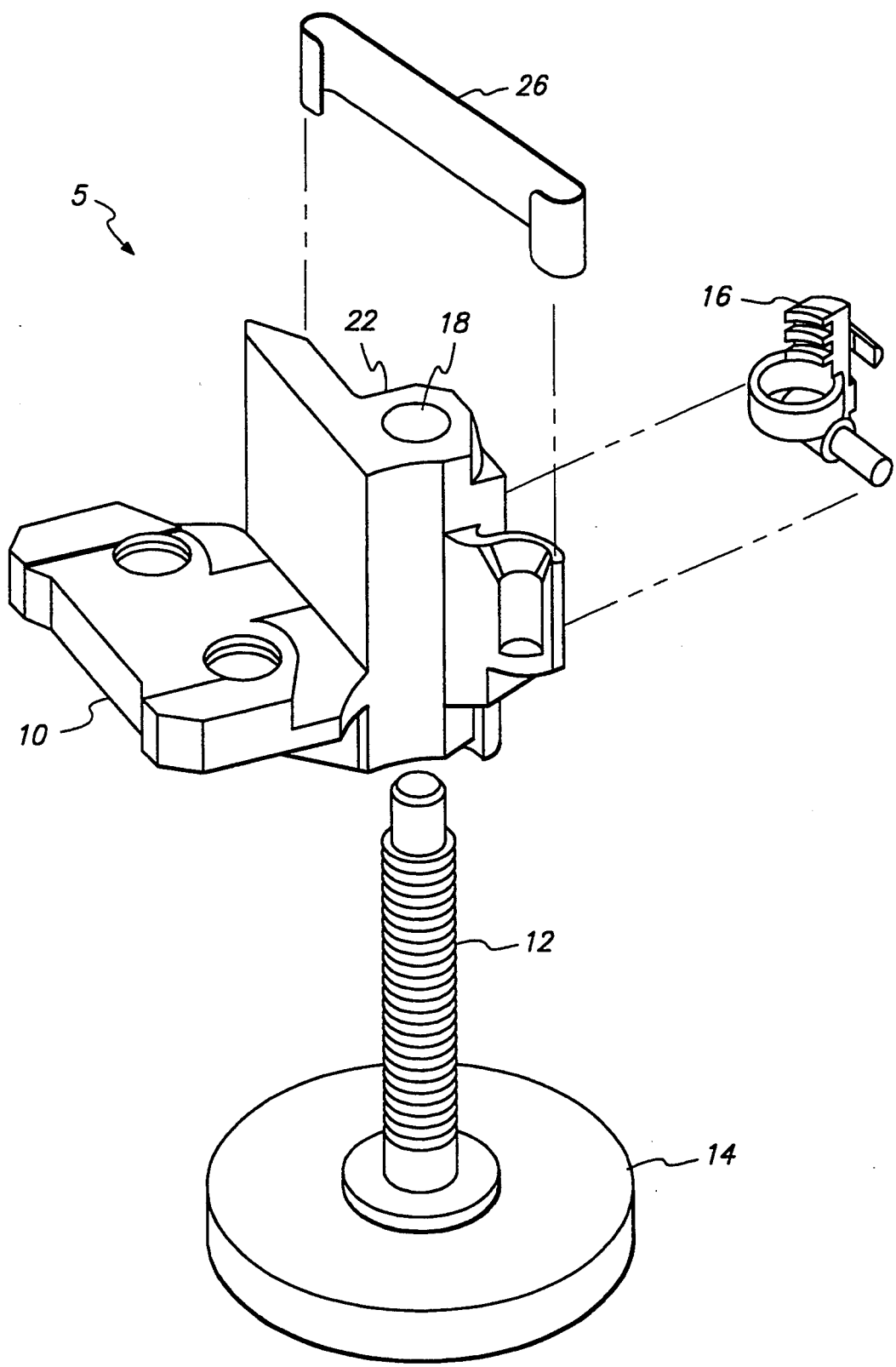
FIG. 1 is an exploded isometric view of a prior art tape head actuator that employs a leaf spring for biasing a partial nut against the threaded output shaft of a stepper motor.
Figure 2:
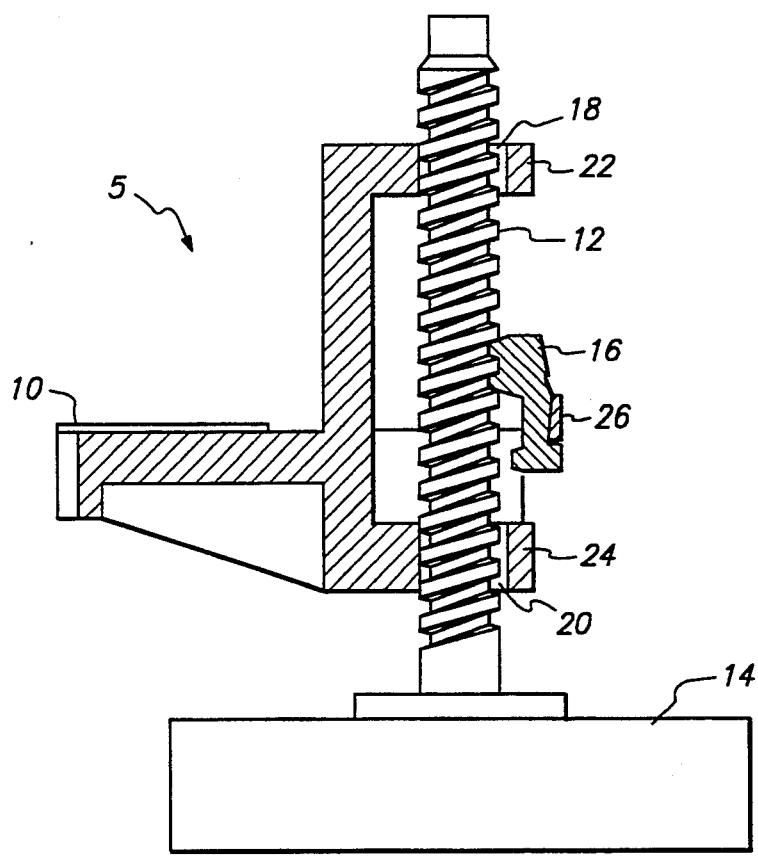
FIG. 2 is a side elevation view, partly in section, of the prior art tape head actuator shown in FIG. 1.
Figure 6:
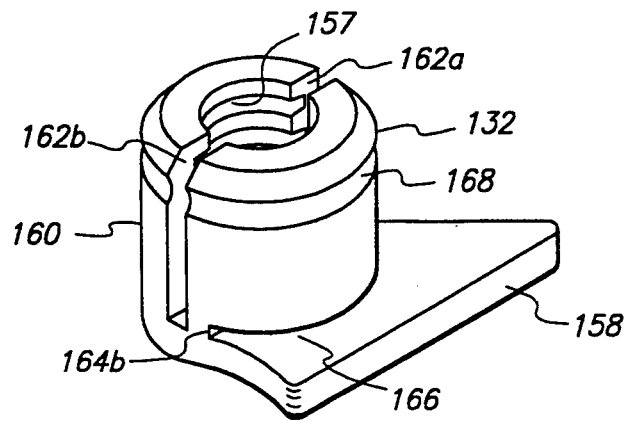
FIG. 6 is an enlarged isometric view of a split nut employed with the tape head actuator shown in FIGS. 4 and 5.

FIGS. 6–8 more clearly show the split nut 132, which can be made of suitable material, such as brass or a resin like acetal with Teflon ®. As shown, the split nut 132 is molded of a polyetherimide with 15% PTFE, LNP Lubricomp EL-4030. The nut 132 has internal screw threads 157 extending for a portion of its length only and includes: a mounting ledge 158, a tubular wall portion 160 having axial slots 162a and 162b, and foot portions 164a and 164b located on each side of the slots 162a and 162b respectively connect the wall portion 160 with the mounting ledge 158. The foot portions 164a and 164b situate the tubular wall portion 160 and the mounting ledge 158 in spaced apart relationship so that there is an annular space or slot 166 between them. So, as shown in the figures, the wall portion 160 can be looked at as being connected to the mounting ledge 158 by four feet. But other arrangements can promote ease in deforming a tubular portion. For example, the wall of a tubular wall portion might be thinner at the region nearer its mounting ledge. Then too, there might be an arrangement eliminating feet immediately adjacent slots as shown in FIGS. 4 and 5 and using two feet, one positioned between the slots—say midway—on each side of a tubular wall portion.

Moreover, the tubular wall portion 160 includes an annular recess 168 in its external circumferential surface into which the circular spring 134 is located.

The configuration of the split nut 132 allows the circular spring 134 to elastically deform it to urge its internal screw threads 157 against the threads 125 of the output shaft 124. And this resilient inward urging by the circular spring 134 is uniform inwardly around the circumference is accomplished without effecting any reactionary forces at the passageways 150 and 152 of the upper and lower ledge portions 144 and 146.

The axial slots 162a and 162b must be of sufficient length and width to permit the nut 132 to be elastically deformed by the inward pressure of an encircling elastic member, such as spring 134, to urge the internal threads 157 of the nut 132 against the threads 125 on the output shaft 124. As shown, the tubular member 160 has a height H of 0.349 inch and the slots 162a and 162b and extend its entire length. Further, as shown, the slots 162a and 162b have divergent walls. As shown, the angle of divergence is small of about 5 degrees to assist in mould release. But the slots can have wall that do not diverge, i.e., are parallel to each other. And for ease of deformation, the nut 132 includes the annular space 166 that has a height h of 0.030 inch.

Other split nut configurations can be used. For example, it my be useful in some situations to use a split nut having only one axial slot—or having more than two. And the axial slot, or slots, need not be open at one end as is the case with the slots 162a and 162b. Moreover, it may be useful in some situations to use a split nut without a radial slot like the slot 166.

In a broad sense, it is only necessary for a split nut to have an axially slotted configuration that allows the cylindrical portion of the nut to be elastically deformed under the pressure of an encircling elastic member, e.g., the circular spring 134, to urge the passageway threads of the split nut radially inwardly around the threaded output shaft of an actuator motor to urge the threads of the nut against the threads of the output shaft.

As shown in the circular spring 134 is a stainless steel spring having an inside diameter of 0.284 inch. The spring 132 has a coil height of 0.047 inch and a coil width of 0.052 inch. It is made of stainless steel wire having a diameter of 0.008 inch.

Other elastic members besides circular springs like spring 134 can be used. For example, one might use an elastic O-ring or a rubber band.

The location of an elastic member on the tubular portion 160 can be varied. As shown, the circular spring 132 is situated on the tubular portion 160 in the annular recess 168 at the open end regions of the slots 162a and 162b, but an elastic member might be positioned at other locations. For example, it might be advantageous to place an elastic member midway along the length of the tubular portion of a split nut. Then too, it might be advantageous in some situations to use more than one elastic member.

While the instant invention has been disclosed in connection with a magnetic tape drive, it is understood that the invention could be employed with disc drives, including both optical and magnetic disc drives.

In view of the foregoing, it will be recognized that while a particular embodiment of the invention has been shown, many modifications may be made within the concept of the invention; therefore, it is not the intent to limit the invention to specific embodiments.

I claim:

1. A head actuator comprising:
   an actuator motor having a threaded output shaft;
   an actuator bracket for holding a head, the actuator bracket including two spaced apart supports, such supports having aligned passageways which include interior bearing surfaces, the output shaft extending through such passageways and being engaged with the interior bearing surfaces of the passageways, the diameter of the output shaft and the passageways being matched for stabilized sliding movement to allow the actuator bracket guided movement back and forth along the output shaft;
   a unitary piece nut directly and rigidly attached to the actuator bracket proximate to a periphery of one of the aligned passageways, the nut including a threaded passageway, the output shaft extending through the passageway of the nut and being in threaded engagement therewith so that rotation of the output shaft moves the actuator bracket along its length, the nut having a slot extending axially of the threaded passageway and in communication therewith; and
   an elastic member encircling the nut in a resilient inwardly pressing relationship intermediate the ends of the slot, the dimensions of the slot and the pressure of the encircling member being such that the nut is elastically deformed to uniformly urge the passageway threads of the nut against the threads of the output shaft without inducing any reactionary forces at the aligned passageways of the actuator bracket.

2. The actuator of claim 1 wherein the slot is open at one end of the threaded passageway.

3. The actuator of claim 2 further including a second slot on the opposite side of the nut from the slot.

4. The actuator of claim 3 wherein the second slot is open at the same end of the threaded passageway as the slot.

5. The actuator of claim 4 wherein the elastic member is a circular spring.

6. The actuator of claim 5 wherein the nut is located between the two spaced apart supports.

7. The actuator of claim 6 wherein the circular spring is located on the nut at the open end region of the slot.

8. The actuator of claim 1 wherein the tubular wall portion includes more than two axial slots.

9. A magnetic tape head actuator comprising:
   a stepper motor having a threaded output shaft of uniform diameter along its length;
   an actuator bracket for holding a magnetic tape head, the actuator bracket including a platform on which the magnetic head rests and a support wall joined to the platform and extending normal thereto, the actuator bracket further including two spaced apart support ledges joined to the support wall on the opposite side thereof from the platform, the support ledges each extending in a direction parallel the platform but in the opposite direction therefrom, the support ledges each having a guide passageway opening therethrough and extending in a direction normal to the platform, such passageways having interior bearing surfaces and being in aligned relationship with each other, the output shaft extending through the passageways and being engaged with the interior bearing surfaces of the passageways, the diameter of the output shaft and the passageways being matched for stabilized sliding movement to allow the actuator bracket guided movement back and forth along the output shaft;
   a nut directly and rigidly attached to the actuator bracket proximate to a periphery of one of the guide passageways, the nut being a unitary piece member including a tubular wall portion and a mounting ledge extending from the tubular wall portion at one end thereof, the tubular wall portion including a threaded passageway, the output shaft extending through the threaded passageway of the tubular wall portion and being in threaded engagement therewith so that rotation of the output shaft moves the actuator bracket along its length, the tubular wall portion having two slots in communication with the threaded passageway, such slots being on opposite sides of the tubular wall portion and each having an open end at the end of the tubular wall portion opposite the mounting ledge; and
   a circular spring encircling the tubular wall portion in a resilient inwardly pressing relationship at the end region of such wall portion opposite the mounting ledge, the dimensions of the slots and the inward pressure of the circular spring being such that the tubular wall portion is elastically deformed to uniformly urge the passageway threads of the tubular wall portion against the threads of the output shaft without inducing any reactionary forces at the guide passageways of the actuator bracket.

10. The magnetic tape head actuator of claim 9 wherein the nut is made of resin.

11. The magnetic tape head actuator of claim 10 wherein the nut is made of a polyetherimide resin.

12. A magnetic tape head actuator comprising:
   a stepper motor having a threaded output shaft of uniform diameter along its length;

an actuator bracket for holding a magnetic tape head, the actuator bracket including a platform on which the magnetic head rests and a support wall joined to the platform and extending normal thereto, the actuator bracket further including two spaced apart support ledges joined to the support wall on the opposite side thereof from the platform, the support ledges each extending in a direction parallel the platform but in the opposite direction therefrom, the support ledges each having a guide passageway opening therethrough and extending in a direction normal to the platform, such passageways being in aligned relationship with each other, the output shaft extending through the passageways, the diameter of the output shaft and the passageways being matched for stabilized sliding movement to allow the actuator bracket guided movement back and forth along the output shaft;

a nut rigidly attached to the actuator bracket, the nut including a tubular wall portion and a mounting ledge joined to the tubular wall portion at one end thereof, the mounting ledge for rigidly mounting the nut to the actuator bracket, the tubular wall portion including a threaded passageway, the output shaft extending through the threaded passageway of the tubular wall portion and being in threaded engagement therewith so that rotation of the output shaft moves the actuator bracket along its length, the tubular wall portion having two slots in communication with the threaded passageway, such slots being on opposite sides of the tubular wall portion and each having an open end at the end of the tubular wall portion opposite the mounting ledge, the nut further including foot portions at the sides of the slots, the foot portions connecting the tubular wall portion to the mounting ledge, the foot portions establishing a space between the tubular wall portion and the mounting ledge; and a circular spring encircling the tubular wall portion in a resilient inwardly pressing relationship at the end region of such wall portion opposite the mounting ledge, the dimensions of the slots and the inward pressure of the circular spring being such that the tubular wall portion is elastically deformed to urge the passageway threads of the tubular wall portion against the threads of the output shaft.

* * * * *